Jan. 20, 1953 I. H. PAGE 2,626,349

INTERFERENCE ELIMINATING CIRCUITS

Filed Aug. 13, 1942 2 SHEETS—SHEET 1

Inventor

Irving H. Page

By J. J. Fitzgerald

Attorney

Jan. 20, 1953 I. H. PAGE 2,626,349

INTERFERENCE ELIMINATING CIRCUITS

Filed Aug. 13, 1942 2 SHEETS—SHEET 2

Inventor

Irving H. Page

By [signature]

Attorney

Patented Jan. 20, 1953

2,626,349

UNITED STATES PATENT OFFICE 2,626,349

INTERFERENCE ELIMINATING CIRCUITS

Irving H. Page, Silver Spring, Md.

Application August 13, 1942, Serial No. 454,640

6 Claims. (Cl. 250—20)

(Granted under Title 35, U. S. Code (1952), sec. 266)

This invention relates broadly to a means for reducing or eliminating strong interfering signals in radio reception and more particularly to such a means applicable to radio echo receivers.

The modern system of radio echo range finding employs a transmitter characterized in the ability to produce a series of sequential, rectangular-shaped pulses, each being of very short duration and separated one from the other by a comparatively long interval of time. These pulses are usually sent out from the transmitter in a unidirectional path and upon striking a remote object are reflected back to the point of transmission or some other point as directed by the angle of incidence. The echo received at either one of these points will be of such low intensity that an exceedingly high gain receiver must be used to amplify the echo to a value capable of producing a distinct signal on the cathode ray tube which is generally used in a receiver of this class. In addition to the high gain characteristic the present receiver must also possess the ability to pass a relatively wide band of frequencies, since a radio echo transmitter will contain side band frequencies extending theoretically to infinity on both sides of the carrier, thus requiring a moderately wide band receiver in order to obtain a satisfactory replica of the transmitter pulse.

Obviously a nearby frequency modulated, amplitude modulated or continuous wave transmitter whose carrier frequency falls within the band width of the receiver will deliver a comparatively strong signal to the receiver antenna which will either block the reception or over-ride the echo. For these reasons the applicant has contrived the present invention.

It is therefore an object of this invention to provide a means for maintaining a high ratio of signal to interference in radio reception.

It is another object of this invention to provide a means in a radio receiver for balancing out strong interfering signals and accepting weak desired signals.

It is another object of this invention to provide a means in a radio echo receiver that will blank the cathode ray tube indicator upon reception of a strong interfering signal.

Other objects of the present invention will become apparent from the following description when taken together with the accompanying drawings, in which:

Fig. 3(*b*) is a graphical representation of the resultant voltages of Fig. 3(*a*);

Figure 1:
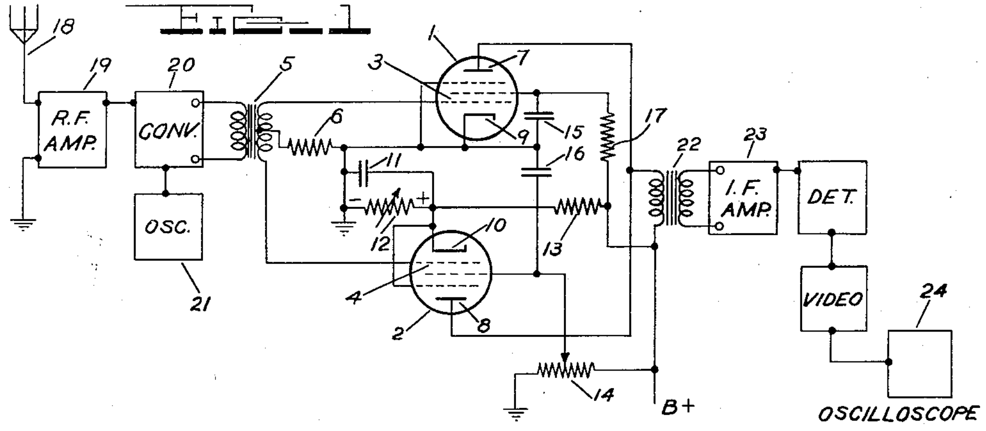
Fig. 1 is a schematic diagram embodying the principles of the present invention.

The interference circuit shown in schematic detail in Fig. 1 employs two tubes 1 and 2 whose control grids 3 and 4 are connected in push-pull relation by the secondary winding of the transformer 5, each having the same grid return resistor 6 and also having their anodes 7 and 8 tied in parallel to the primary winding of transformer 22. The cathode 9 of tube 1 is grounded and therefore possesses zero bias, while the cathode 10 of tube 2 has, in combination, a self-bias through the parallel capacitance 11 and variable resistance 12 and a fixed bias through the resistance 13 and the B supply. Capacitance 15 and 16 are radio frequency by-pass condensers to ground for the screen grids while the fixed resistance 17 is a dropping resistor for the screen supply of tube 1. The voltage gain of tube 2 can be controlled by cathode resistance 12 and screen resistance 14.

The action of the present circuit may be understood by considering a strong interference signal of the proper frequency cutting the antenna 18 at the same time that an echo cuts the antenna. Both signals receive equal amplification by the radio frequency amplifier 19 and subsequently are sent on to the converter 20 where they are heterodyned to some lower frequency by the local oscillator 21. Considering, now, the strong interfering signal which alternately swings the control grids of both tubes positive and then negative in phase opposition. The positive half-cycles applied to the grid 3 of tube 1 are clipped by grid current flowing through resistance 6, but the negative half-cycles are amplified and appear in the tube plate circuit as positive half-cycles. Conversely, the negative swings of grid 4 of tube 2 are clipped since the grid is already strongly negative, but the positive swings are amplified and passed on to the output as negative pulses. Thus the outputs of both tubes 1 and 2 are in phase opposition and will therefore buck one another. The output from tube 2 can be adjusted by resistances 12 and 14 so that it will cancel the output from tube 1. Now consider the weak echo signals swinging the control grids in a similar manner. Both the positive and negative swings of grid 4 will be clipped since the negative bias on this grid is so strong that the tube is operating far down on the "knee" or cut-off portion of the saturation curve. Because of the weak grid swings of tube 1 there will be a reduction of grid current flowing, consequently dropping tube 1 down to class A operation thereby amplifying and passing both the positive and negative swings of grid 3. It is therefore apparent that the only signals which successfully reach the output transformer 22 are those of the echo which are passed through tube 1. From this transformer the signal is fed into an intermediate amplifier 23, then a detector, a video amplifier and finally the oscilloscope 24.

Figure 3A:
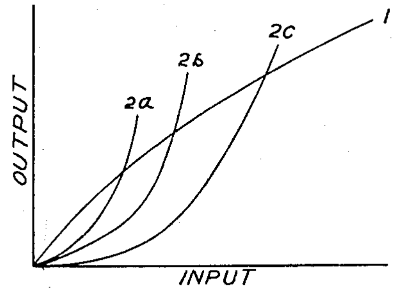
Fig. 3(*a*) is a graphical representation of the voltage output of the tubes in Figs. 1 and 2.
Figure 3B:
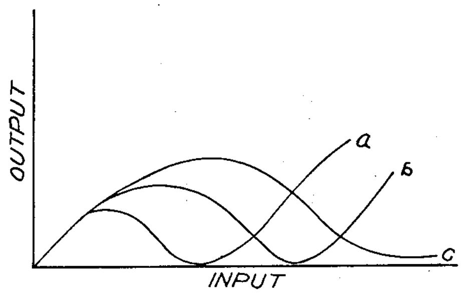

A more complete understanding of the effective output from this interference reducing circuit may be had by referring to Figs. 3*a* and 3*b*. The curve 1 is a plot of the output versus the input of tube 1. The curves 2*a*, 2*b* and 2*c* are plots of the output versus the input of tube 2 under different adjustments of bias. It must be remembered that the curves of tubes 1 and 2 in Figs. 3*a* are 180° out of phase so the resultant output will be that shown by the curves in Fig. 3*b*. Upon examining this figure it is clearly seen how the combined output from tubes 1 and 2 may be peaked at different points along the input axis by changing the amount of bias on tube 2. This provides a very effective means of controlling the interfering signals for various signal strengths.

Figure 2:
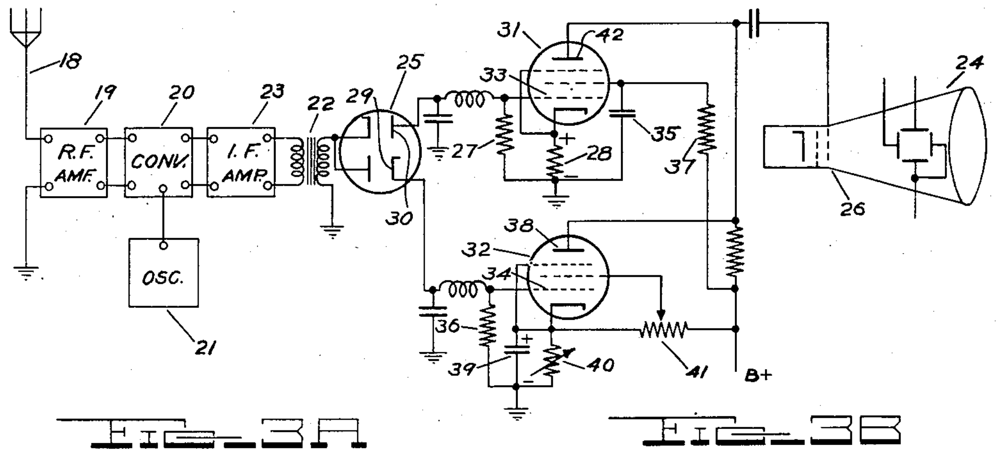
Fig. 2 is a schematic diagram embodying a modification of the present invention.

Now to examine the operation of the interference circuit of Fig. 2. This circuit comprises the video amplifier of the receiver, and therefore feeds its output directly to the oscilloscope. The input electrodes of tubes 31 and 32 are connected to the anode 30 and cathode 29 respectively of a twin diode 25 which has its other anode and cathode energized by one side of the secondary winding of the intermediate transformer 22. For purposes of explanation consider only the envelopes of both the interfering and echo signals, since this circuit comprises the video stage of the receiver. Considering first, the strong interfering signal, the negative half cycles of which drive the upper section of the twin diode 25 into conduction to thereby impress a rectified negative signal on the grid 33 of tube 31. This signal is amplified and inverted to appear at the plate of tube 31 as a positive signal. Alternately, the positive half-cycles of the interfering signal drive the lower section of the twin diode into conduction to thereby impress a rectified positive signal on the grid 34 of tube 32. This signal is amplified and inverted to appear at the plate of tube 32 as a negative signal. The half-cycles of the signal occur alternately but the envelopes can be considered as occurring simultaneously. Since anodes 38 and 42 are tied in parallel the output envelopes therefrom will buck one and another, thus by adjusting the variable resistance 40 and potentiometer 41 the outputs can be made to cancel out with the exception of small transients which may occur at the beginning and end of the pulse envelope.

By inserting resistance 28 in the cathode of tube 31 there might be a small amount of degeneration inherent in the tube which would result in the negative output of tube 32 predominating over the positive output of tube 31. This would simply blank the oscilloscope with the output tied to the intensity grid of the scope.

Now consider the weak echo signal being impressed upon the input of the twin diode 25, the positive half cycles of which drive the lower section of the diode into conduction to thereby impress a positive pulse on the grid 34 of tube 32. This pulse is clipped since the negative bias is so strong and the signal is so weak. The negative half cycles of the echo signal, however, drive the upper section of the twin diode 25 into conduction to thereby impress a negative pulse on grid 33 of tube 31. This pulse is amplified and sent on to the intensity grid 26 of the oscilloscope as a positive pulse. At this point it should be noted that the output of the video amplifier can be applied to either the deflecting plate or the intensity grid of the oscilloscope.

Figure 4:
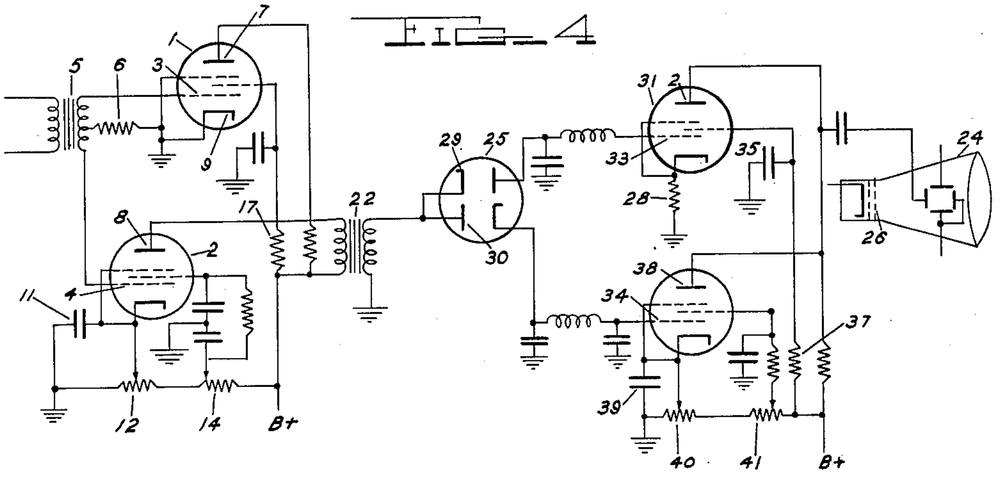
Fig. 4 is a schematic diagram illustrating the incorporation of Figs. 1 and 2 to form another embodiment of this invention.

Thus by combining the two circuits previously described and shown in Figs. 1 and 2 into a cascade circuit similar to Fig. 4 and comprising the intermediate frequency and video amplifiers of a receiver an excellent system of interference elimination may be realized. This circuit provides excellent control and cancellation of interfering signals up to 5 volts with other signals coming through successfully.

Figure 5:
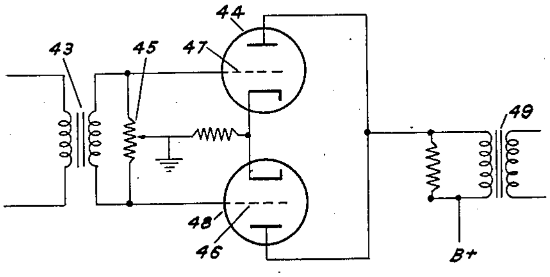
Fig. 5 is another modification of Fig. 1.

Another scheme of interference elimination is disclosed by the circuit contained in Fig. 5. This circuit contains two tubes 44 and 48 having their grids operating in push-pull and their anodes in parallel. A potentiometer 45 is placed across the secondary winding of the input transformer 43 to provide an adjustment of the amount of input each tube receives and thereby governs which tube precedes in the point of saturation. For example, consider each tube as having a gain of 20 and the potentiometer 45 being set at a point where tube 44 receives twice the input as tube 48. Tube 44 has a gain of 20 on all signals below saturation while tube 48 has a gain of 10 thus providing a net gain of 10 since the simultaneous outputs of the two tubes oppose each other.

When tube 44 reaches saturation and tube 48 approaches saturation the net gain will decrease accordingly until both tubes are saturated and thereby produce a net gain of zero. The most intense echo signals will not usually drive the tubes to saturation and consequently the resultant output voltage is proportional to the resultant curve of Fig. 6.

Figure 6:
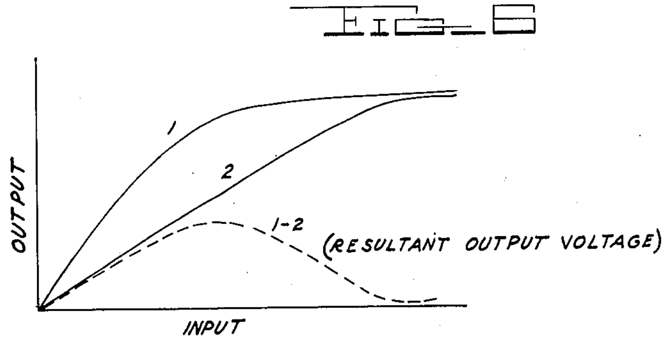
Fig. 6 is a graphical representation of the voltage outputs and resultant output of the tubes in the circuit of Fig. 5.

A typical set of curves are plotted in Fig. 6 for one setting of the potentiometer. The peaking of the resultant output can of course be varied along the input axis as will be determined by the setting of the potentiometer 45.

Although I have shown and described certain and specific embodiments of the present invention I am fully aware of the many modifications possible thereof. Therefore, this invention is not to be restricted except insofar as is necessitated by prior art and the spirit of the appended claims.

The invention described herein may be manufactured and used by or for the Government of the United States of America for governmental purposes without the payment of any royalties thereon or therefor.

I claim:

1. A means of eliminating interfering signals from electromagnetic wave receivers tuned to receive a signal of predetermined frequency comprising a pair of amplifying tubes each having an anode, a cathode and a grid, an input transformer having primary and secondary windings, said secondary winding connecting said grids in push-pull relation, an output transformer also having primary and secondary windings, said anodes connected in parallel and to one terminal of the primary winding of said output transformer, the cathode of one of said tubes tied to ground, a capacitance and variable resistance tying the cathode of the other of said tubes to ground and a means for exciting the primary of said input transformer with said interfering and tuned signals.

2. A means of eliminating interfering signals from electromagnetic wave receivers tuned to receive a signal of predetermined frequency comprising a pair of amplifying tubes each having a cathode, an anode, a control grid and a screen grid, an input transformer having primary and secondary windings, said secondary winding connecting said control grids in push-pull relation, an output transformer also having primary and secondary windings, said anodes connected in parallel and to one terminal of the primary winding of said output transformer, the cathode of one of said tubes tied to ground, a parallel capacitance and variable resistance tying the cathode of the other of said tube to ground, a fixed resistance connecting the screen grid of first mentioned tube to the anode supply, a variable resistance connecting the screen grid of the other of said tubes to the anode supply and a means for exciting the primary of said input transformer with said interfering and said tuned signals.

3. A means for eliminating interference signals in electromagnetic wave receiver tuned to receive a predetermined desired signal comprising, a pair of amplifying tubes each having at least an anode, a cathode, and a grid, an output means, said anodes being connected in parallel and to said output means, means detecting and impressing the negative half envelopes of both said interfering signals and said desired signal on the grid of one of the said tubes and the positive half envelopes of said interfering signal and said desired signal on the grid of the other of said pair of tubes, and means operative to bias said other of said tubes near cut-off and said one of said tubes near zero.

4. A circuit for suppressing strong unwanted signals from the output of a radio frequency receiver tuned to receive input signals of lesser intensity than said unwanted signals comprising, a pair of amplifying tubes each having grid, cathode and anode electrodes, the anodes of said tubes connected in parallel, a utilization device coupled to said anodes, a phase splitter supplying both the unwanted and the desired signals to the grids of said tubes in push-pull relationship, a bias source connected between the grid and cathode electrodes of one of said tubes to bias said tube to cut-off, whereby only large positive polarity signal voltages are translated by said one of said tubes, and a grid return for the other of said tubes including a grid current limiting resistor connecting the grid of said other tube to its cathode to provide near zero bias therefor whereby weak signals of either polarity are amplified by said other tube and large positive polarity signals are grid limited thereby.

5. A circuit for suppressing strong unwanted signals from the output of a radio receiver subject to receive input signals of lesser intensity than the unwanted signals, comprising a pair of amplifying tubes each having at least an anode, a cathode and a grid, means connecting said anodes together in parallel, detecting means connected to the grid electrodes of said tubes, said detecting means being operative to apply the positive detected envelopes of the incoming signals to the grid of one of said tubes and the negative detected envelopes to the grid of the other of said tubes, means biasing said one of said tubes to substantially plate current cut-off whereby only the large amplitude incoming signals are translated thereby, means establishing a near zero bias for said other of said tubes whereby both the large and small amplitude incoming signals are translated thereby, and means for controlling the gain of said one tube to effect substantial amplitude equality in the simultaneous output signals delivered by said tubes.

6. A circuit for suppressing strong unwanted signals from the output of a radio receiver subject to receive input signals of lesser intensity than said unwanted signals comprising, a detector circuit having a pair of output terminals one of which provides detected output signals of one polarity and the other of which provides detected output signals of an opposite polarity, a pair of signal transmission channels, one of said transmission channels coupled to one of said detector output terminals and adapted to translate a wide amplitude range of detected output signals, the other of said transmission channels coupled to the other of said detector output terminals and adapted to translate only those detected output signals fed hereto which exceed a predetermined amplitude, and output means coupled to said transmission channels for combining in opposition the output signals derived therefrom.

IRVING H. PAGE.

REFERENCES CITED

The following references are of record in the file of this patent:

UNITED STATES PATENTS

| Number | Name | Date |
|---|---|---|
| 1,705,993 | Oswald | Mar. 19, 1929 |
| 1,765,606 | Ohl | June 24, 1930 |
| 1,814,051 | McCaa | July 14, 1931 |
| 1,822,922 | Culver | Sept. 15, 1931 |
| 1,901,929 | Peterson | Mar. 21, 1933 |
| 1,959,275 | McCaa | May 15, 1934 |
| 2,001,622 | McCaa | May 14, 1935 |
| 2,199,820 | Gannett | May 7, 1940 |
| 2,215,946 | Radinger | Sept. 24, 1940 |
| 2,265,269 | Dallos | Dec. 9, 1941 |